United States Patent
Klonowski et al.

(10) Patent No.: US 11,608,184 B2
(45) Date of Patent: Mar. 21, 2023

(54) HYBRID PROPULSION SYSTEM FOR MULTI-ROTOR ROTARY WING AIRCRAFT, COMPRISING IMPROVED DC/AC CONVERSION MEANS

(71) Applicant: SAFRAN HELICOPTER ENGINES, Bordes (FR)

(72) Inventors: Thomas Klonowski, Moissy-Cramayel (FR); Ludovic Meziere, Moissy-Cramayel (FR); Bernard Plissonneau, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 257 days.

(21) Appl. No.: 16/336,537

(22) PCT Filed: Sep. 27, 2017

(86) PCT No.: PCT/FR2017/052595
§ 371 (c)(1),
(2) Date: Mar. 26, 2019

(87) PCT Pub. No.: WO2018/060591
PCT Pub. Date: Apr. 5, 2018

(65) Prior Publication Data
US 2020/0115062 A1    Apr. 16, 2020

(30) Foreign Application Priority Data
Sep. 29, 2016 (FR) ...................... 16 59366

(51) Int. Cl.
*B64D 27/24* (2006.01)
*B64C 27/08* (2023.01)
(Continued)

(52) U.S. Cl.
CPC .............. *B64D 27/24* (2013.01); *B64C 27/08* (2013.01); *B64C 27/14* (2013.01); *B64C 27/16* (2013.01); *B64D 2027/026* (2013.01)

(58) Field of Classification Search
CPC ........ B64C 2201/024; B64C 2201/042; B64C 2201/048; B64C 27/08; B64C 27/14;
(Continued)

(56) References Cited

U.S. PATENT DOCUMENTS

| 1,754,192 A | * | 4/1930 | Van Vliet | ............... B64D 35/08 |
| | | | | 416/26 |
| 2,462,201 A | * | 2/1949 | Kilgore | .................. B64D 27/24 |
| | | | | 244/60 |

(Continued)

FOREIGN PATENT DOCUMENTS

| CN | 105711826 A | 6/2016 |
| CN | 205554582 U | 9/2016 |

(Continued)

OTHER PUBLICATIONS

Search Report issued in French Patent Application No. 1659366 dated Jun. 1, 2017.

(Continued)

*Primary Examiner* — Medhat Badawi
(74) *Attorney, Agent, or Firm* — Pearne & Gordon LLP

(57) ABSTRACT

In order to reduce the weight of a hybrid propulsion system for a multi-rotor rotary-wing aircraft, the system comprises at least one inverter configured to supply power in parallel to multiple electric motors intended to drive the corresponding propellers of the system.

16 Claims, 3 Drawing Sheets

(51) Int. Cl.
  *B64C 27/14* (2006.01)
  *B64C 27/16* (2006.01)
  *B64D 27/02* (2006.01)

(58) Field of Classification Search
  CPC .. B64C 27/16; B64D 2027/026; B64D 27/24;
    B64D 15/12; B64D 27/10; H01L 35/32;
    H02K 16/02; H02K 21/48; H02K 7/1823;
    H02K 7/20; H02J 3/02; F04D 25/06
  See application file for complete search history.

(56) References Cited

U.S. PATENT DOCUMENTS

| | | | | | |
|---|---|---|---|---|---|
| 2,499,314 | A | * | 2/1950 | Hunt | B64C 27/43 |
| | | | | | 416/131 |
| 2,604,949 | A | * | 7/1952 | McDonald | B64C 27/82 |
| | | | | | 416/121 |
| 2,698,147 | A | * | 12/1954 | Hovgard | B64C 27/12 |
| | | | | | 244/7 R |
| 3,332,404 | A | * | 7/1967 | Lovercheck | F02B 61/04 |
| | | | | | 123/55.2 |
| 3,332,643 | A | * | 7/1967 | Toner | B64C 29/0016 |
| | | | | | 244/7 R |
| 4,554,989 | A | * | 11/1985 | Gruich | B64C 27/12 |
| | | | | | 180/65.245 |
| 6,164,590 | A | * | 12/2000 | Kusic | B64C 27/08 |
| | | | | | 244/17.11 |
| 6,382,556 | B1 | * | 5/2002 | Pham | B64C 27/28 |
| | | | | | 244/6 |
| 8,646,720 | B2 | * | 2/2014 | Shaw | B64C 29/0025 |
| | | | | | 244/17.23 |
| 8,870,114 | B2 | * | 10/2014 | Botti | B64D 27/04 |
| | | | | | 244/54 |
| 9,194,285 | B2 | * | 11/2015 | Botti | B64C 27/14 |
| 9,837,952 | B1 | * | 12/2017 | Carcia | H02P 27/08 |
| 10,120,013 | B2 | * | 11/2018 | Klonowski | G01R 31/086 |
| 2002/0047071 | A1 | * | 4/2002 | Illingworth | F15D 1/00 |
| | | | | | 244/199.1 |
| 2002/0100835 | A1 | * | 8/2002 | Kusic | B64C 29/0033 |
| | | | | | 244/17.23 |
| 2003/0192304 | A1 | * | 10/2003 | Paul | F02C 3/045 |
| | | | | | 60/262 |
| 2007/0034735 | A1 | * | 2/2007 | Kusic | B64C 27/08 |
| | | | | | 244/17.23 |
| 2007/0181742 | A1 | * | 8/2007 | Van de Rostyne | A63H 27/06 |
| | | | | | 244/17.23 |
| 2008/0048065 | A1 | * | 2/2008 | Kuntz | B64C 39/024 |
| | | | | | 244/17.23 |
| 2008/0184906 | A1 | * | 8/2008 | Kejha | B64C 39/024 |
| | | | | | 102/374 |
| 2009/0230235 | A1 | * | 9/2009 | McNulty | B64C 27/467 |
| | | | | | 244/17.23 |
| 2011/0001020 | A1 | * | 1/2011 | Forgac | B64C 39/024 |
| | | | | | 244/7 A |
| 2012/0012693 | A1 | * | 1/2012 | Thomassey | B64C 27/82 |
| | | | | | 244/17.21 |
| 2013/0062455 | A1 | * | 3/2013 | Lugg | B64C 39/12 |
| | | | | | 244/12.3 |
| 2013/0147204 | A1 | | 6/2013 | Botti et al. | |
| 2014/0008485 | A1 | * | 1/2014 | Lundgren | A63H 27/12 |
| | | | | | 244/17.13 |
| 2014/0034775 | A1 | * | 2/2014 | Hutson | B64C 27/006 |
| | | | | | 244/17.17 |
| 2014/0203739 | A1 | * | 7/2014 | Chantriaux | H02P 5/74 |
| | | | | | 318/139 |
| 2014/0248168 | A1 | * | 9/2014 | Chantriaux | B64C 27/14 |
| | | | | | 417/410.1 |
| 2014/0290208 | A1 | * | 10/2014 | Rechain | B64C 27/04 |
| | | | | | 60/39.23 |
| 2014/0346283 | A1 | * | 11/2014 | Salyer | B64D 27/24 |
| | | | | | 244/7 A |
| 2016/0059958 | A1 | * | 3/2016 | Kvitnevskiy | B64C 27/08 |
| | | | | | 701/3 |
| 2016/0236790 | A1 | * | 8/2016 | Knapp | B64C 11/44 |
| 2017/0066531 | A1 | * | 3/2017 | McAdoo | H02J 7/14 |
| 2017/0077856 | A1 | * | 3/2017 | Mir | H02P 23/0077 |
| 2017/0203839 | A1 | * | 7/2017 | Giannini | B64D 27/24 |
| 2018/0354623 | A1 | * | 12/2018 | Bhat | B64C 27/10 |
| 2019/0233128 | A1 | * | 8/2019 | Klonowski | H01L 35/32 |
| 2019/0263519 | A1 | * | 8/2019 | Argus | B64D 31/06 |
| 2020/0115062 | A1 | * | 4/2020 | Klonowski | B64C 27/16 |

FOREIGN PATENT DOCUMENTS

| | | |
|---|---|---|
| FR | 2962407 A1 | 1/2012 |
| FR | 2990573 A1 | 11/2013 |
| JP | 2015137092 A | 7/2015 |

OTHER PUBLICATIONS

International Search Report issued in Application No. PCT/FR2017/052595 dated Dec. 21, 2017.

Nritten Opinion issued in Application No. PCT/FR2017/052595 dated Dec. 21, 2017.

* cited by examiner

HYBRID PROPULSION SYSTEM FOR MULTI-ROTOR ROTARY WING AIRCRAFT, COMPRISING IMPROVED DC/AC CONVERSION MEANS

This is the National Stage application of PCT international application PCT/FR2017/052595, filed on Sep. 27, 2017 entitled "HYBRID PROPULSION SYSTEM FOR MULTI-ROTOR ROTARY-WING AIRCRAFT, COMPRISING IMPROVED DC/AC CONVERSION MEANS", which claims the priority of French Patent Application No. 16 59366 filed Sep. 29, 2016, both of which are incorporated herein by reference in their entirety.

DESCRIPTION

Technical Field

The present invention relates to a hybrid propulsion system for multi-rotor rotary wing aircrafts, as well as a method for manufacturing such a hybrid propulsion system.

State of Prior Art

From the state of the art, it is known a hybrid propulsion system for a multi-rotor rotary wing aircraft comprising:
- an internal combustion engine, and an electric generator coupled to the internal combustion engine such that in use, the internal combustion engine drives the electric generator,
- a rectifier connected to the electric generator to convert an alternating current delivered by the electric generator into a direct current, means for converting the direct current into alternating current, and an electric network connecting the rectifier to the conversion means,
- electric motors connected to the conversion means such that in use, the conversion means supply the first electric motors with alternating current, and
- propellers coupled to the electric motors such that in use, the electric motors drive the propellers.

In particular, the conversion means comprise inverters respectively connected to the electric motors so as to supply the latter with alternating current.

However, these propulsion systems have the drawback to be relatively heavy.

DISCLOSURE OF THE INVENTION

In particular, the invention has the purpose to provide a simple, economic and efficient solution to this problem.

To that end, it provides a hybrid propulsion system for a rotary wing aircraft, comprising:
- an internal combustion engine and an electric generator coupled to the internal combustion engine such that in use, the internal combustion engine drives the electric generator,
- a rectifier connected to the electric generator to convert an alternating current delivered by the electric generator into a direct current, conversion means configured to convert the direct current into alternating current, and an electric network connecting the rectifier to the conversion means,
- at least one first group of at least two first electric motors connected to the conversion means such that in use, the conversion means supply the first electric motors with alternating current, and
- propellers respectively coupled to the first electric motors such that in use, the first electric motors drive the propellers.

According to the invention, the conversion means comprise a first inverter configured to supply the first electric motors in parallel.

The main principle of the invention thus consists in joining together the power supply of several electric motors of a hybrid propulsion system of a rotary wing aircraft by means of a same inverter.

Thus, the invention allows a weight reduction with respect to the known hybrid propulsion systems, on the one hand, by reducing the number of inverters, and also by reducing the number and weight of the CEM filters.

Furthermore, the power supply of several electric motors by a same inverter enables the synchronisation of these electric motors to be optimised. That enables the lift of the hybrid propulsion system to be improved.

Preferably, the first electric motors supplied by the first inverter are two in number.

In some embodiments of the invention, the propellers coupled to the first electric motors are two coaxial contra-rotating propellers.

In a preferred embodiment of the invention, the hybrid propulsion system comprises at least one other group of at least two other electric motors, and other propellers respectively coupled to these other electric motors, and the conversion means comprise, for the or each other group of other electric motors, another corresponding inverter configured to supply the other corresponding electric motors in parallel.

In this case, the first electric motors and the other motors have advantageously an intrinsic characteristic the variance of which, calculated for the motors of any of the first group and the other or each other group, is lower than the variance of said intrinsic characteristic calculated for all the first electric motors and the other electrical motors.

The intrinsic characteristic(s) considered are preferably electric or electromagnetic characteristics such as stator resistances, synchronous inductances, and rotor fluxes.

Preferably, the hybrid propulsion system further comprises an energy storage unit connected to the electric network in parallel with the electric generator.

The invention also relates to a multi-rotor rotary wing aircraft, comprising a hybrid propulsion system of the type described above.

The invention further relates to a method for manufacturing a hybrid propulsion system of the type described above, comprising at least the respective steps of:
- providing a plurality of electric motors, propellers, an internal combustion engine, an electric generator, a rectifier, an electric network, and a first inverter;
- coupling the electric generator to the internal combustion engine;
- connecting the rectifier to the electric generator;
- connecting the first inverter to the rectifier by means of the electric network;
- selecting, among the plurality of electric motors, a first group of at least two first electric motors;
- connecting the first electric motors in parallel with the first inverter;
- coupling at least part of the propellers to the first electric motors.

In the preferred embodiment of the invention, the method further comprises the respective steps of:
- selecting, among the plurality of electric motors, at least one other group of at least two other electric motors;

providing, for the or each other group of other electric motors, a corresponding other inverter;

connecting the other electric motors of the or each other group in parallel with the corresponding other inverter.

Preferably, the first electric motors and the other electric motors are chosen so as to have an intrinsic characteristic the variance of which, calculated for the motors of any of the first group and the other or each other group, is lower than the variance of said intrinsic characteristic calculated for all the first electric motors and the other electric motors.

BRIEF DESCRIPTION OF THE DRAWINGS

The invention will be better understood, and further details, advantages and characteristics thereof will appear upon reading the following description made by way of non-limiting example and in reference to the appended drawings in which.

DETAILED DISCLOSURE OF PREFERRED EMBODIMENTS

Figure 1:
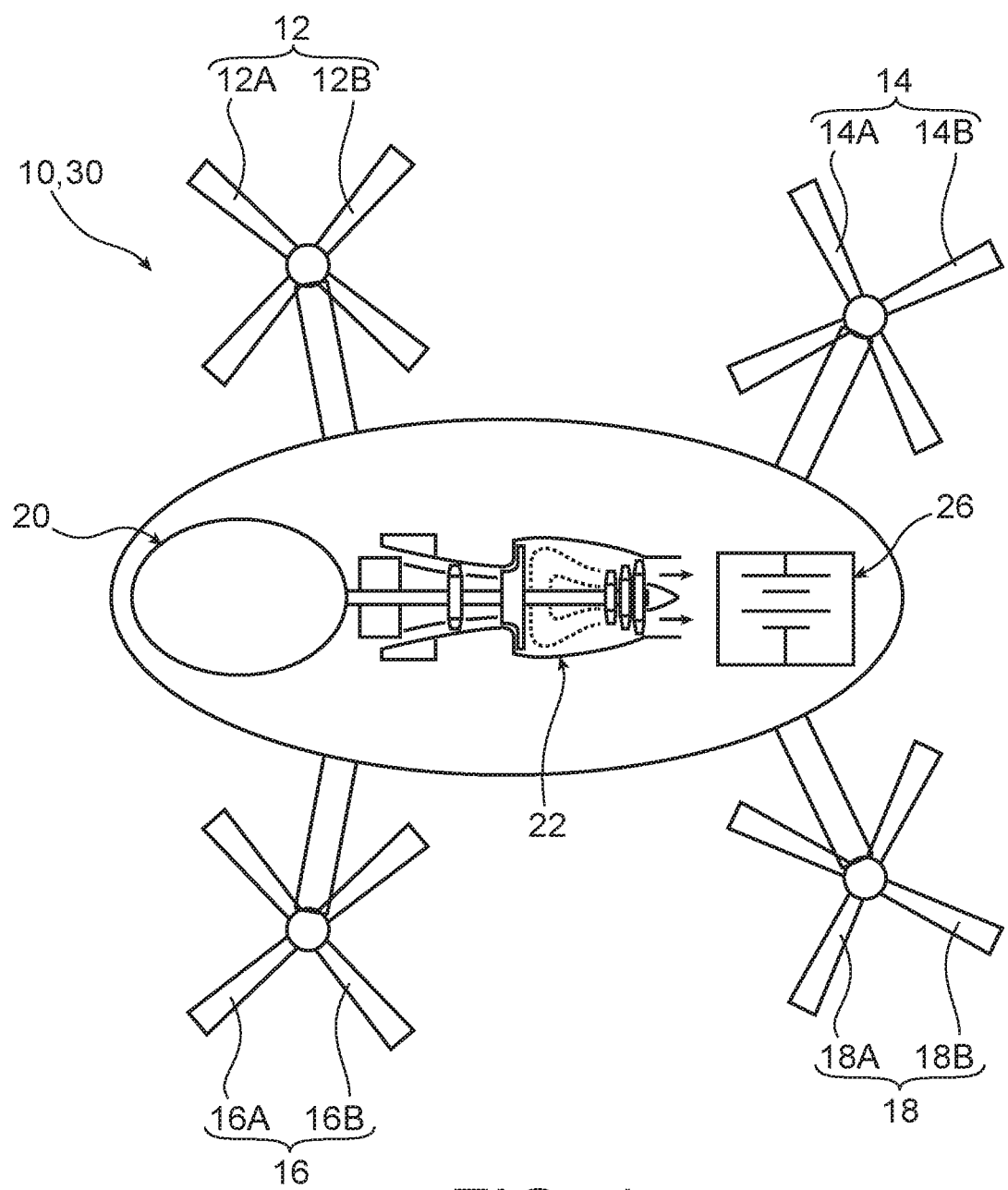
FIG. 1 is a schematic top view of a multi-rotor rotary wing aircraft according to a preferred embodiment of the invention.

FIG. 1 illustrates a rotary wing aircraft 10, for example an octorotor aircraft, of the type comprising four pairs 12, 14, 16, 18 of contra-rotating propellers 12A, 12B, 14A, 14B, 16A, 16B, 18A, 18B.

Generally, these propellers are respectively coupled to electric motors (non-visible in FIG. 1) which therefore rotatably drive the propellers. These electric motors are themselves supplied with electric energy by an electric generator 20 driven by an internal combustion engine 22 such as a turbomachine. The connection between the electric generator 20 and the electric motors is operated in direct current, under a relatively high voltage, for the purpose of improving the power supply stability and power management. To that end, a rectifier ensures conversion of the alternating current delivered by the electric generator 20 into direct current, whereas conversion means ensure conversion of this direct current into alternating current for the electric motors, as will more clearly appear in what follows. The connection between the electric generator 20 and the direct current electric motors is in particular advantageous because the electric generator 20 operates at a constant rate and thus makes it possible to have a stable direct current voltage after conversion.

Preferentially, an energy storage unit 26 is also provided to temporarily supply the electric motors by completing or substituting for the electric generator 20, in a known manner per se. The energy storage unit 26 is for example of the electrochemical type but can alternatively be of the electrostatic (capacitive) or mechanical type.

The direct current connection mentioned above has in this case a further advantage because such a connection provides a simple manner to connect the electric generator 20 and the energy storage unit 26, on the one hand, to the electric motors, on the other hand.

Alternatively, the energy storage unit 26 can be connected to the rest of the system through a chopper, also called a direct-direct current converter, making it possible in particular to ensure a proper recharge of the energy storage unit 26 and also to ensure a redundancy of the electrical system should the energy storage unit 26 be failing.

Figure 2:
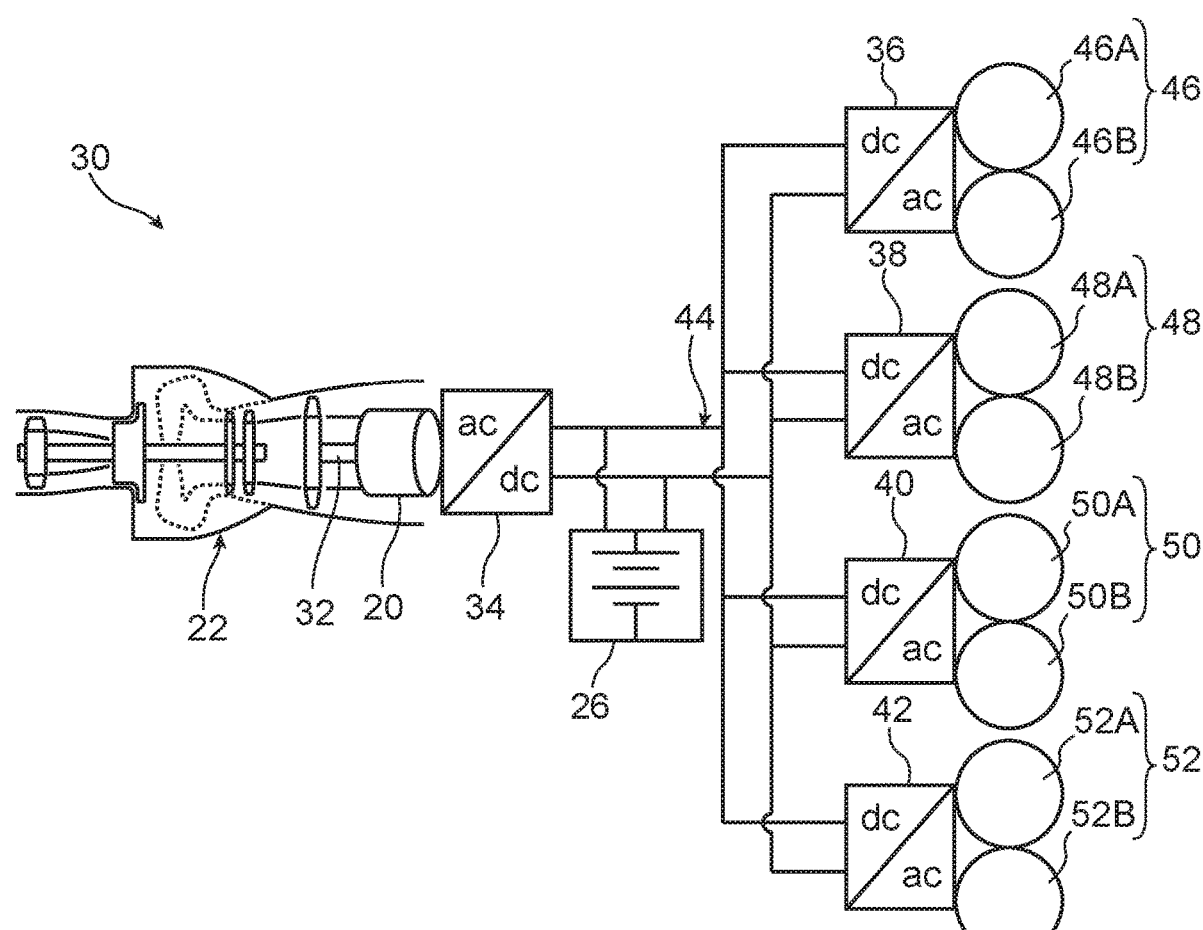
FIG. 2 is a partial schematic view of a hybrid propulsion system equipping the aircraft of FIG. 1.

All of these elements form a hybrid propulsion system 30, which will now be described in further detail in reference to FIG. 2.

The hybrid propulsion system 30 thus comprises the internal combustion engine 22 and the electric generator 20. The latter typically includes a rotor coupled to an output shaft 32, such as a shaft of a free or connected turbine, of the internal combustion engine 22.

An electrical output of the electric generator 20 is connected to an input of the rectifier 34 to convert the alternating current AC provided by the electric generator 20 into direct current DC.

An output of the rectifier 34 is connected in parallel, by means of an electric network 44, to respective inputs of conversion means, namely a first inverter 36, a second inverter 38, a third inverter 40 and a fourth inverter 42, provided to reconvert the direct current DC into alternating current AC for supplying the electric motors.

More precisely, the first inverter 36 has an output connected in parallel to a first group 46 of two first electric motors 46A, 46B, thus supplied with alternating current AC by the first inverter 36.

Analogously, the other inverters 38, 40, 42 have respective outputs which are respectively connected in parallel to other groups 48, 50, 52 each comprising two other corresponding electric motors 48A, 48B, 50A, 50B, 52A, 52B.

The hybrid propulsion system 30 thus includes several groups each having two electric motors, and is configured such that the motors of a same group are supplied with electric energy by a same corresponding inverter.

Both electric motors 46A-52B of each group are respectively coupled to both propellers of a corresponding pair 12-18 of contra-rotating propellers.

Supplying the electric motors by a same inverter enables the weight of the hybrid propulsion system to be reduced.

In addition, such a configuration enables these motors, and thus the propellers driven by the same to be properly synchronised. That enables the lift of the hybrid propulsion system to be improved, particularly in the case of a contra-rotating propeller system such as the system illustrated in the figures.

On the other hand, the energy storage unit 26 is also connected in parallel to each of the inverters 36-42.

The electric motors 46A-52B are all of the same type. However, to optimise the joint control and the synchronisation of both motors of each group, the electric motors 46A-52B are distributed in the different groups 46-52 so as to have at least one intrinsic characteristic the variance of which, calculated for the electric motors of any of the groups 46-52, is lower than the variance of said intrinsic characteristic calculated for all the electric motors 46A-52B. In other words, the electric motors are gathered according to the value of the abovementioned intrinsic characteristic to minimise the value deviation in this characteristic within each group.

The intrinsic characteristic(s) considered are preferably electric or electromagnetic characteristics such as stator resistances, synchronous inductances, and rotor fluxes.

In the preferred embodiment of the invention, the electric motors 46A-52B are multiphase asynchronous motors. These motors can be of different types such as induction motors or variable reluctance motors.

Preferentially, both electric motors of each group are of the multirotor mono-stator type, which enables weight and volume of the electric motors to be reduced while aiding in minimising the variance of the stator starting resistors of the electric motors within each group. That in particular enables the equality of the respective electric currents within both electric motors of a same group to be favoured.

Figure 3:
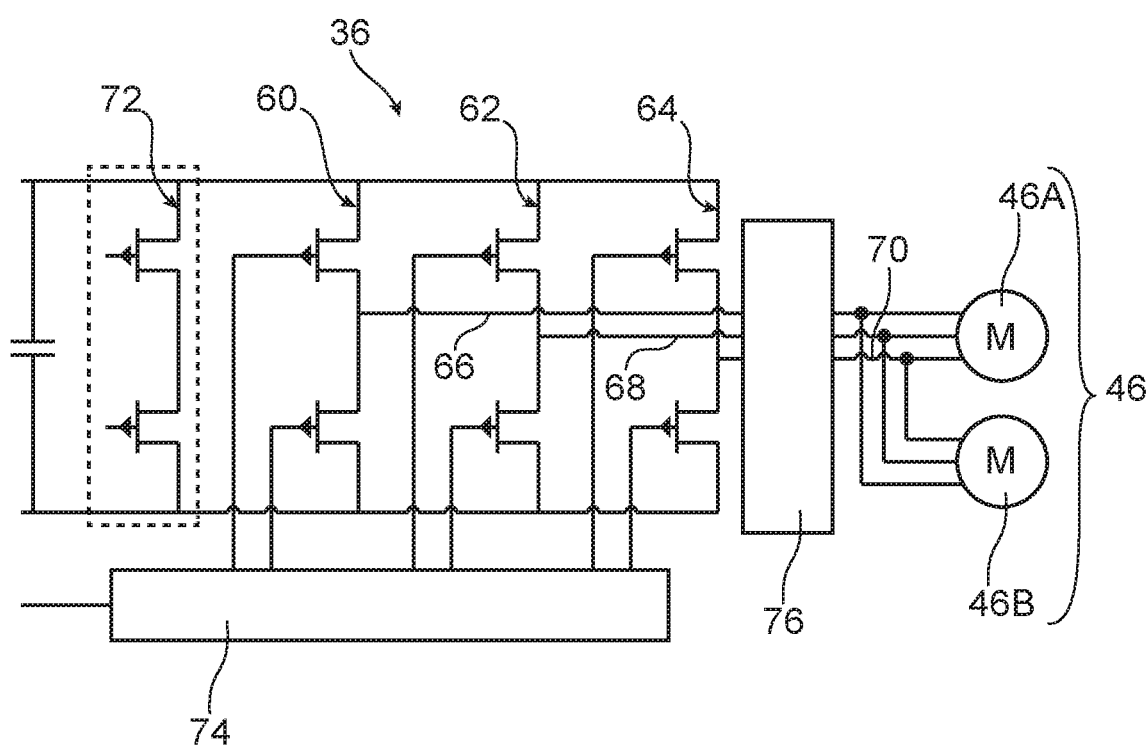
FIG. 3 is a schematic view of a part of the hybrid propulsion system of FIG. 2, illustrating in particular an inverter and two electric motors belonging to this system.

FIG. 3 illustrates an exemplary configuration of the first inverter 36 as well as the first two electric motors 46A, 46B. The other inverters 38-42 have an analogous configuration.

As shown in FIG. 3, the first inverter 36 is a bridge inverter comprising three inverter arms 60, 62, 64 respectively delivering the three alternating current phases 66, 68, 70 to each of both first electric motors 46A, 46B. The first inverter 36 includes a backup inverter arm 72 which is initially inoperative and which is provided to replace one of the three arms 60, 62, 64 should it fails. The first inverter 36 further includes conventionally a module 74 for controlling the inverter arms 60, 62, 64 and a CEM filtering module 76.

The hybrid propulsion system 30 can be manufactured by means of a method comprising the steps of:
- providing the electric motors 46A-52B, the propellers 12A-18B, the internal combustion engine 22, the electric generator 20, the rectifier 34, the electric network 44, and the conversion means consisting of the first inverter 36, the second inverter 38, the third inverter 40 and the fourth inverter 42;
- coupling the electric generator 20 to the internal combustion engine 22;
- connecting the rectifier 34 to the electric generator 20;
- connecting each of the inverters 36-42 to the rectifier 34 by means of the electric network 44;
- distributing the electric motors 46A-52B into groups of two motors, such that the variance of at least one intrinsic characteristic of the electric motors calculated for the motors of any of the groups 46-52, is lower than the variance of said intrinsic characteristic calculated for all the electric motors 46A-52B;
- connecting the electric motors of each group to a corresponding inverter 36-42 in parallel;
- coupling the propellers to the electric motors 46A-52B respectively.

As explained above, the general principle of the invention consists in joining together the power supply of electric motors of a hybrid propulsion system of a multi-rotor rotary wing aircraft by means of inverters.

This general principle can be applied to various configurations of hybrid propulsion systems, without departing from the scope of the present invention.

Thus, the number of propellers can be higher than or lower than 8. It can for example be equal to four in the case of a quadrirotor type aircraft, sometimes called a quadricopter. In addition, the propellers driven by the electric motors of a same group may not assume a configuration of coaxial contra-rotating propellers.

The number of inverters can also vary, as well as the type of these inverters.

In addition, the number of electric motors supplied by a same inverter can be higher than two. However, it is desirable that this number remains relatively low to preserve a sufficient redundancy of the propulsion members, such a redundancy being desirable to ensure aircraft safety.

In its most general aspect, the hybrid propulsion system according to the invention thus includes at least one inverter and at least two electric motors supplied by this inverter.

What is claimed is:

1. A hybrid propulsion system (30) for a multi-rotor rotary wing aircraft (10), comprising:
- an internal combustion engine (22) and an electric generator (20) coupled to the internal combustion engine such that in use, the internal combustion engine drives the electric generator (20),
- a rectifier (34) connected to the electric generator (20), said rectifier (34) configured to convert an alternating current delivered by the electric generator (20) into a direct current, conversion means configured to convert the direct current into alternating current, and an electric network (44) connecting the rectifier (34) to the conversion means,
- at least one first group (46) of at least two first electric motors (46A, 46B) connected to the conversion means such that in use, the conversion means supply the first electric motors (46A, 46B) with alternating current,
- first propellers (12A, 12B) respectively coupled to the first electric motors (46A, 46B) such that in use, the first electric motors (46A, 46B) drive the propellers (12A, 12B), wherein the conversion means comprise a first inverter (36) configured to supply alternating current to the first electric motors (46A, 46B) in parallel,
- wherein the first inverter (36) is a bridge inverter comprising three inverter arms respectively delivering three alternating current phases to each of the first electric motors (46A, 46B), and
- wherein the first inverter (36) further comprises a backup inverter arm which is initially inoperative and is configured to replace at least one of the three inverter arms that fail.

2. The hybrid propulsion system according to claim 1, wherein the first electric motors (46A, 46B) supplied by the first inverter (36) are two in number.

3. The hybrid propulsion system according to claim 2, wherein the first propellers (12A, 12B) coupled to the first electric motors (46A, 46B) are two coaxial contra-rotating propellers.

4. The hybrid propulsion system according to claim 1, comprising at least one second group (48, 50, 52) of at least two second electric motors (48A, 48B, 50A, 50B, 52A, 52B), and second propellers (14A, 14B, 16A, 16B, 18A, 18B) respectively coupled to the at least two second electric motors (48A, 48B, 50A, 50B, 52A, 52B), and wherein the conversion means comprise, for the at least one second group of the at least two second electric motors, another corresponding inverter (38, 40, 42) configured to supply alternating current to the at least two other corresponding electric motors (48A, 48B, 50A, 50B, 52A, 52B) in parallel.

5. The hybrid propulsion system according to claim 4, wherein the first electric motors (46A, 46B) and the at least two second electric motors (48A, 48B, 50A, 50B, 52A, 52B) have an intrinsic characteristic the variance of which, calculated for the motors of any of the first group (46) and the at least one second group (48, 50, 52), is lower than the variance of said intrinsic characteristic calculated for all of the first electric motors (46A, 46B) and the at least two second electric motors (48A, 48B, 50A, 50B, 52A, 52B).

6. The hybrid propulsion system according to claim 1, further comprising an energy storage unit (26) connected to the electric network (44) in parallel with the electric generator (20).

7. A multi-rotor rotary wing aircraft (10), comprising a hybrid propulsion system (30) according to claim 1.

8. A method for manufacturing a hybrid propulsion system (30) for a multi-rotor rotary wing aircraft (10), the method comprising the steps of:

providing a plurality of electric motors, propellers, an internal combustion engine (22), an electric generator (20), a rectifier (34), an electric network (44), and a first inverter (36);

coupling the electric generator (20) to the internal combustion engine (22);

connecting the rectifier (34) to the electric generator (20);

connecting the first inverter (36) to the rectifier (34) by means of the electric network (44);

selecting, among the plurality of electric motors, a first group (46) of at least two first electric motors (46A, 46B);

connecting the first electric motors (46A, 46B) in parallel with the first inverter (36), wherein the first inverter (36) is a bridge inverter comprising three inverter arms respectively delivering three alternating current phases to each of the first electric motors (46A, 46B);

coupling at least part of the propellers (12A, 12B) to the first electric motors (46A, 46B);

whereby, in use, the internal combustion engine (22) drives the electric generator (20), the rectifier (34) converts an alternating current delivered by the electric generator (20) into a direct current, conversion means convert the direct current into alternating current, the conversion means supply the first electric motors (46A, 46B) with alternating current, the first electric motors (46A, 46B) drive the propellers (12A, 12B), and the first inverter (36) supplies alternating current to the first electric motors (46A, 46B) in parallel, wherein the first inverter (36) further comprises a backup inverter arm which is initially inoperative and is configured to replace at least one of the three inverter arms that fail.

9. The method according to claim 8, further comprising the steps of:

selecting, among the plurality of electric motors, at least one second group (48, 50, 52) of at least two second electric motors (48A, 48B, 50A, 50B, 52A, 52B);

providing, for the at least one second group of the at least two second electric motors, another corresponding inverter (38, 40, 42);

connecting the at least two second electric motors of the at least one second group in parallel with the corresponding other inverter.

10. The method according to claim 9, wherein the first electric motors (46A, 46B) and the at least two second electric motors (48A, 48B, 50A, 50B, 52A, 52B) are chosen to have an intrinsic characteristic the variance of which, calculated for the motors of any of the first group (46) and the at least one second group (48, 50, 52), is lower than the variance of said intrinsic characteristic calculated for all of the first electric motors and the at least two second electric motors.

11. The hybrid propulsion system according to claim 1, wherein an output of the rectifier is connected to an input of the conversion means.

12. The hybrid propulsion system according to claim 1, wherein the conversion means is configured to reconvert the direct current, received from an output of the rectifier, to the alternating current that is supplied to the first electric motors.

13. The hybrid propulsion system according to claim 6, wherein the energy storage unit is connected to the hybrid propulsion system by a chopper.

14. The method according to claim 8, wherein an output of the rectifier is connected to an input of the conversion means.

15. The method according to claim 8, wherein the conversion means is configured to reconvert the direct current, received from an output of the rectifier, to the alternating current that is supplied to the plurality of electric motors.

16. The method according to claim 8, further comprising at least one of connecting an energy storage unit (26) connected to the electric network (44) in parallel with the electric generator (20), or connecting the energy storage unit to the hybrid propulsion system by a chopper.

* * * * *